July 2, 1963 P. HADZERIGA 3,096,152
PROCESS FOR REMOVAL OF SULFATE FROM MAGNESIUM CHLORIDE BRINES
Filed Jan. 10, 1961
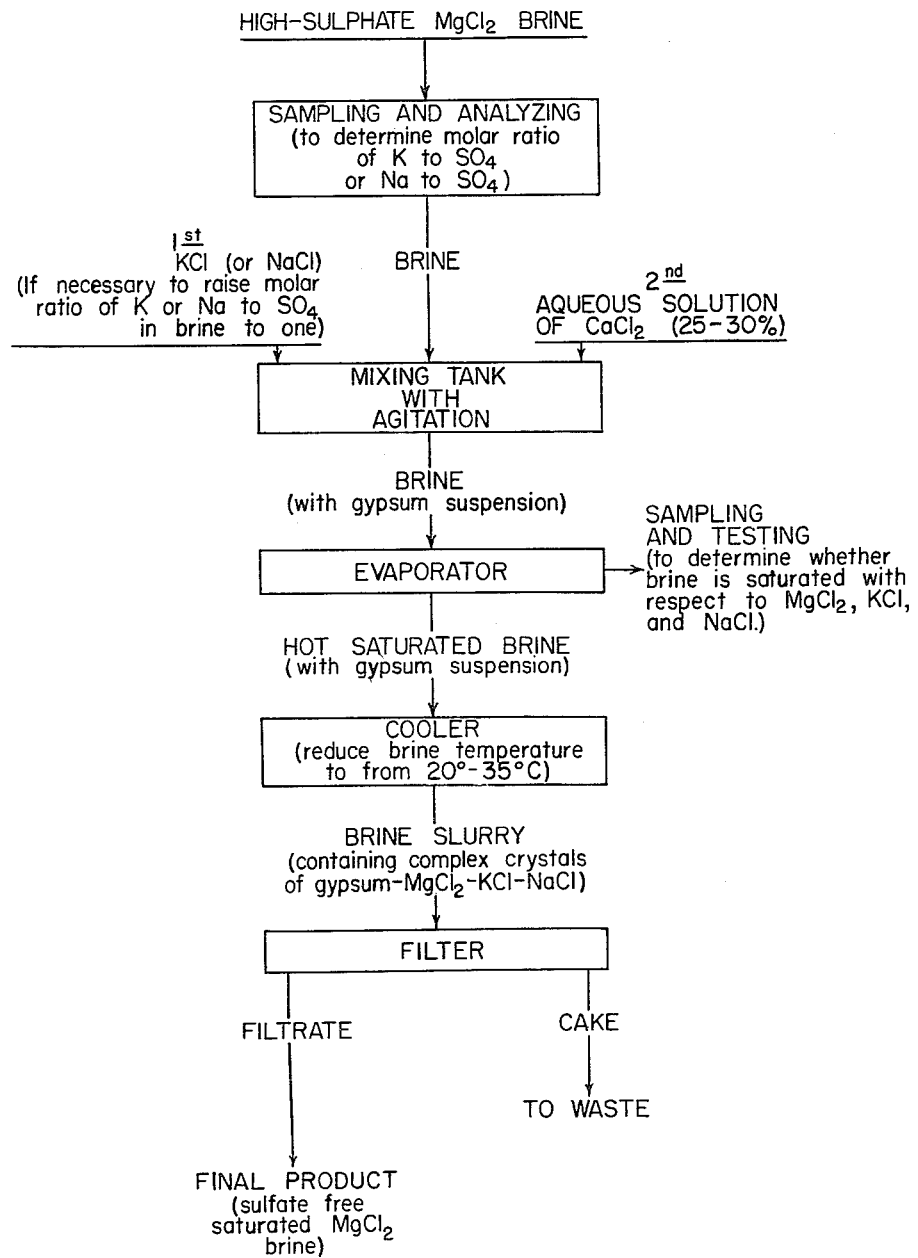
INVENTOR.
PABLO HADZERIGA
BY Mallinckrodt and Mallinckrodt
ATTORNEYS

United States Patent Office 3,096,152
Patented July 2, 1963

3,096,152
PROCESS FOR REMOVAL OF SULFATE FROM MAGNESIUM CHLORIDE BRINES
Pablo Hadzeriga, Salt Lake City, Utah, assignor, by mesne assignments, to Standard Magnesium Corporation, Inc., Tulsa, Okla., a corporation of New York
Filed Jan. 10, 1961, Ser. No. 81,903
10 Claims. (Cl. 23—91)

This invention relates to the chemical treatment of magnesium chloride brines for the removal of sulfate ions, so that an exceptionally pure magnesium chloride liquor can be obtained.

Magnesium chloride brines containing a significant quantity of magnesium sulfate along with potassium and sodium chlorides are commonly produced as waste in connection with certain industrial operations, particularly those directed toward the recovery of valuable salts by solar evaporation of natural brines, such as underground waters of salt flats adjacent the Great Salt Lake and reject brines from the production of NaCl from sea water. It has heretofore been economically impossible to remove the sulfate therefrom. Consequently, common practice has been to run such brines to waste, regardless of the values remaining therein.

Often the brines contain, in solution, small quantities of such valuable constituents as lithium chloride and rare earth chlorides. It may be desirable to recover these constituents, but, in any event, they must be removed from the brines if an exceptionally pure magnesium chloride liquor is to be obtained for the ultimate production of an exceptionally high quality magnesium oxide product by known decomposition procedures. Removal by known processes is incomplete so long as any significant quantity of sulfate remains in the brine.

One way of removing sulfate from a magnesium chloride brine is to add calcium chloride, in solution and in small excess of the stoichiometric, for precipitating the sulfate as the relatively insoluble calcium sulfate, which can be removed by filtration. However, this procedure is very difficult to carry out commercially, because minor variations in brine composition will cause relatively great changes in physical characteristics of the precipitated calcium sulfate. Often such calcium sulfate is unfilterable, for the reason that it occurs in the slurry as a rubbery solid which tends to both pass through and to stick on the filter cloth. Moreover, the solubility of calcium sulfate is such that there is always a residual sulfate content of at least about 0.5%, which is too much for the subsequent satisfactory preparation of a purified magnesium salt.

Accordingly, a principal object of this invention is to provide a commercially feasible process for removing sulfate from magnesium chloride brines to produce a product substantially free of sulfate, i.e. containing not more than about 0.04% sulfate.

Important features of the invention in the accomplishment of this object are, first, to ascertain the molar ratio of potassium to sulfate in the brine, and, if it is less than one, to raise such ratio to at least one by the addition of potassium, usually in the form of KCl; then, to add a small excess of the calculated stoichiometric amount of an unsaturated, aqueous solution (preferably 25–30%) of calcium chloride at a controlled rate while agitating the brine, thereby forming a suspension of gypsum crystals; subjecting the brine with its suspension of gypsum crystals to evaporation until a saturated salt solution is obtained, from which complex crystals of gypsum, magnesium chloride, potassium chloride, and sodium chloride precipitate; cooling such saturated salt solution to accomplish precipitation of additional complex crystals; and separating these complex salt crystals from the mother liquor, advantageously by filtration, leaving such mother liquor as a substantially sulfate-free, MgCl₂ brine, which can be effectively processed for recovery of valuable constituents therefrom and for the production of high quality magnesium oxide. It should be noted that this sulfate-free, MgCl₂ brine is also substantially free of potassium and sodium.

Addition of the calcium chloride solution to the brine is controlled from a time standpoint. It is very important that the addition be gradual, so that the gypsum crystals will grow slowly and be easily filterable. Addition of 800 pounds of the CaCl₂ solution to 5000 pounds of brine in from 5 to 7 minutes has proven satisfactory in pilot plant operations.

Evaporation of the treated brine should be carried out to the extent of eliminating the water introduced with the CaCl₂ solution as well as some of the water from the original brine, so as to yield a brine saturated with respect to MgCl₂, KCl, and NaCl. Laboratory tests have shown that this condition is ordinarily attained when the boiling point of the brine system reaches about 120° C.

Cooling the heated brine to room temperature, i.e. to from 20–35° C., ordinarily induces additional crystallization. Aging of the solution is not necessary. Tests have shown no appreciable difference in sulfate elimination between a brine filtered immediately upon cooling and the same brine filtered after 24 hours have passed following its cooling to room temperature.

The brine should always be cooled before filtration in order to remove the maximum amount of sulfate. Tests have shown that twice as much of the sulfate is removed when the brine is filtered after cooling than when filtered hot.

It is characteristic of the process of the invention that the filter cake contains a considerable quantity of a complex, calcium sulfate, magnesium chloride, potassium chloride salt. While the composition of the cake will vary, depending upon the composition of the original brine, upon the amount of water evaporated therefrom, and upon the temperature to which the heated brine was cooled, the ideal composition will be very nearly:

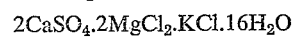
$$2CaSO_4 \cdot 2MgCl_2 \cdot KCl \cdot 16H_2O$$

plus NaCl and a very small amount of LiCl. However, it may go as far as:

$$CaSO_4 \cdot 2MgCl_2 \cdot KCl \cdot 14H_2O$$

In any event, the complex salt is easily filterable and permits the sulfate to be readily separated from the brine along with the potassium and sodium, leaving an exceptionally pure MgCl₂ brine.

By proper control of the evaporation and cooling, as indicated, it is possible to obtain filter cakes wherein the molar ratio between the different constituents is fairly constant from cake to cake.

Preferred practice in the carrying out of the process is shown by the flow sheet of the accompanying drawing.

As indicated in the flow sheet, the high-sulfate, magnesium chloride brine is first subjected to sampling and testing by customary analytical procedures to determine the molar ratio of potassium to sulfate. If such molar ratio is less than one, sufficient potassium is added to raise the ratio to one.

The magnesium chloride brine produced near Wendover Utah, as an incident of potassium chloride recovery operations applied to the underground brine occurring there, contains from 2.5 to 3.5% MgSO₄. It is necessary that the molar ratio of potassium to sulfate be at least one if filterable sulfate crystals are to be obtained. However, some of this brine has stood in ponds at the surface for periods of one or more years and contains appreciably less MgSO₄.

I have found that, whenever $MgSO_4$ content of a brine is not significantly over 2%, there is no need to be concerned about the molar ratio of potassium to sulfate in order to insure filterability of precipitated sulfate. Yet, if the specified molar ratio is adhered to, a reduction in sulfate content of the final brine product from about 0.10% to not more than about 0.04% is obtained and the filterability is appreciably increased.

Addition of calcium chloride solution to the brine is preferably carried out in a mixing tank equipped with an agitator, the introduction of the $CaCl_2$ solution being gradual as previously indicated. Upon completion of such addition, there will be a suspension of gypsum crystals in the brine.

Any suitable evaporating equipment can be employed for eliminating excess water from the gypsum-carrying brine, so as to place it in the desired saturated condition and bring about the specified crystallization. Likewise, any suitable cooling equipment may be employed to reduce the temperature of the hot, saturated, gypsum-carrying brine for subsequent filtration.

The cool, saturated brine slurry of sulfate salt crystals and gypsum is easily filtered, so that filtration is the preferred way of separating the solids from the $MgCl_2$ brine to yield the final product—a sulfate-free, saturated, $MgCl_2$ brine. The filter cake is normally regarded as a waste product.

The following examples are typical of many successful pilot plant tests made on natural $MgCl_2$ brines found in the Wendover area of Tooele County, Utah:

Example 1

A brine to be processed was sampled and the sample subjected to standard analysis, which showed the following composition:

| | Percent |
|---|---|
| $MgCl_2$ | 29.71 |
| $MgSO_4$ | 4.01 |
| $KCl$ | .38 |
| $NaCl$ | .73 |
| $LiCl$ | .88 | with a molar ratio of K to $SO_4$ of 0.15. Accordingly, in proceeding with the process on a quantity of 5000 pounds of brine, 105 lbs. of KCl dissolved in 305 lbs. of warm water was first thoroughly mixed with the brine. Then a solution of 258.5 lbs. of $CaCl_2$ (75% purity), dissolved in 437.5 lbs. of water, was introduced into the brine over a period of about seven minutes while continuously agitating the brine. Evaporation of the so-treated brine to a point where density tests showed saturation with respect to the soluble constituents $MgCl_2$, KCl, and NaCl, followed by cooling to room temperature and by filtration, produced a dry, crystalline filter cake having the following composition:

| | Percent |
|---|---|
| $CaSO_4 \cdot 2H_2O$ | 37.70 |
| $MgCl_2 \cdot 6H_2O$ | 44.38 |
| $K_2SO_4$ | 1.56 |
| $KCl$ | 10.47 |
| $NaCl$ | 3.12 |
| $LiCl$ | .17 |
| $H_2O$ | 2.60 | with a molar ratio of 1.00 $CaSO_4$, 1.00 $MgCl_2$, and 0.64 KCl. The sulfate-free, $MgCl_2$ brine obtained as the filtrate showed only 0.04% residual sulfate.

Example 2

Standard analysis of a sample of a different brine showed the following composition:

| | Percent |
|---|---|
| $MgSO_4$ | 3.50 |
| $MgCl_2$ | 21.33 |
| $KCl$ | 3.96 |
| $NaCl$ | 3.00 |
| $LiCl$ | .53 | with a molar ratio of K to $SO_4$ of 1.83. Because this molar ratio exceeded one, it was unnecessary to add potassium either to insure filterability or to remove the maximum quantity of sulfate from the brine. In proceeding with the process, a solution of 225.5 lbs. of $CaCl_2$ (75% purity), dissolved in 612.5 lbs. of water, was added to 5000 lbs. of the brine over a period of about nine minutes while continuously agitating the brine. Evaporation and cooling as in the first example produced a dry, crystalline filter cake having the following composition:

| | Percent |
|---|---|
| $CaSO_4 \cdot 2H_2O$ | 21.22 |
| $MgCl_2 \cdot 6H_2O$ | 50.15 |
| $CaCl_2$ | .07 |
| $KCl$ | 16.77 |
| $NaCl$ | 10.17 |
| $LiCl$ | .09 |
| $H_2O$ | 2.53 | with a molar ratio of 1.00 $CaSO_4$, 2.00 $MgCl_2$, and 1.83 KCl. The sulfate-free, $MgCl_2$ brine obtained as the filtrate again showed only 0.04% residual sulfate.

Laboratory tests have shown that the process of this invention can be usefully, though not as satisfactorily, carried out with respect to sodium content of the $MgCl_2$ brine, instead of with respect to the potassium content. Thus, instead of testing for and adding potassium, the molar ratio of sodium to sulfate can be tested for and an aqueous solution of NaCl added to a sodium-deficient brine. It should be realized, however, that there will be a significant sacrifice in filterability if this alternative procedure is followed. This is no doubt due to the fact that carnallite ($KCl \cdot MgCl_2 \cdot 6H_2O$) is a known salt, while no corresponding sodium salt is known.

While molar proportion additions of potassium or sodium may be made to a potassium-deficient or to a sodium-deficient brine in various forms, the advantages of an aqueous solution of KCl or NaCl from the standpoint of economy and convenience are apparent.

$MgCl_2$ brines containing both KCl and NaCl are most common and are specifically dealt with herein, but the process is also applicable to $MgCl_2$ brines containing either potassium or sodium values whether or not such values occur as chlorides.

Whereas there is here illustrated and described a certain preferred procedure which I presently regard as the best mode of carrying out my invention, it should be understood that various changes may be made without departing from the inventive concepts particularly pointed out and distinctly claimed herebelow.

I claim:

1. A process for removing sulfate ions from magnesium chloride brines containing a significant quantity of said ions as well as ions of at least one alkali metal selected from the group of alkali metals consisting of potassium and sodium, comprising first sampling and analyzing such a brine to determine the molar ratio of ions of said at least one alkali metal to sulfate ions, and, if said ratio is less than one, adding to said brine a material which will supply a sufficient quantity of ions of the one alkali metal concerned to raise said ratio to at least one; then, while agitating the brine, gradually adding at least the stoichiometric amount of an unsaturated, aqueous solution of calcium chloride to react with the sulfate present to produce crystals of gypsum; subjecting the resulting brine and gypsum crystal slurry, essentially without solids separations, to evaporation until saturated with respect to a chloride of said at least one alkali metal, and with respect to magnesium chloride, resulting in the precipitation of a multitude of crystals of gypsum, magnesium chloride, and a chloride of said at least one alkali metal; and separating said crystals from the brine component of said slurry to yield a magnesium chloride brine which is substantially free of sulfate ions, and of potassium ions and/or sodium ions, depending upon which ions are present.

2. The process of claim 1, wherein the material added to the brine is a chloride.

3. The process of claim 1, wherein separation of the crystals from the brine component of the slurry is accomplished by filtration.

4. A process for removing sulfate ions from magnesium chloride brines containing a significant quantity of said ions as well as potassium ions, comprising first sampling and analyzing such a brine to determine the molar ratio of potassium ions to sulfate ions, and, if said ratio is less than one, adding to said brine a material which will supply a sufficient quantity of potassium ions to raise said ratio to at least one; then, while agitating the brine, gradually adding at least the stoichiometric amount of an unsaturated, aqueous solution of calcium chloride to react with the sulfate present to produce crystals of gypsum; subjecting the resulting brine and gypsum crystal slurry, essentially without solids separations, to evaporation until saturated with respect to potassium chloride, and to sodium chloride if sodium ions are present, and with respect to magnesium chloride, resulting in the precipitation of a multitude of crystals of gypsum, magnesium chloride, and potassium chloride, along with sodium chloride if sodium ions are present; and separating said crystals from the brine component of said slurry to yield a magnesium chloride brine which is substantially free of sulfate, potassium, and sodium.

5. The process of claim 4, wherein separation of the crystals from the brine component of the slurry is accomplished by filtration.

6. The process of claim 4, wherein the material added to the brine is potassium chloride.

7. A process for removing sulfate ions from magnesium chloride brines containing a significant quantity of said ions, as well as sodium ions, comprising first sampling and analyzing such a brine to determine the molar ratio of sodium ions to sulfate ions, and, if said ratio is less than one, adding to said brine a material which will supply a sufficient quantity of sodium ions to raise said ratio to at least one; then, while agitating the brine, gradually adding at least the stoichiometric amount of an unsaturated, aqueous solution of calcium chloride to react with the sulfate present to produce crystals of gypsum; subjecting the resulting brine and gypsum crystal slurry, essentially without solids separation, to evaporation until saturated with respect to sodium chloride, and to potassium chloride if potassium ions are present, and with respect to magnesium chloride, resulting in the precipitation of a multitude of crystals of gypsum, magnesium chloride, and sodium chloride, along with potassium chloride if potassium ions are present; and separating said crystals from the brine component of said slurry to yield a magnesium chloride brine which is substantially free of sulfate, sodium, and potassium.

8. The process of claim 7, wherein the material added to the brine is sodium chloride.

9. A process for removing sulfate ions from magnesium chloride brines containing a significant quantity of sulfate ions, potassium ions, and sodium ions, comprising first analyzing such a brine to determine the molar ratio of potassium ions to sulfate ions, and, if said ratio is less than one, adding to said brine a sufficient quantity of potassium chloride to raise said ratio to at least one; then, while agitating the brine, gradually adding at least the stoichiometric amount of an unsaturated, aqueous solution of calcium chloride to react with the sulfate present to produce crystals of gypsum; subjecting the resulting brine and gypsum crystal slurry, essentially without solids separation, to evaporation until saturated with respect to magnesium chloride, potassium chloride, and sodium chloride, resulting in the precipitation of a multitude of crystals of gypsum, magnesium chloride, potassium chloride, and sodium chloride; and separating said crystals from the brine component of said slurry to yield a magnesium chloride brine which is substantially free of sulfate, potassium, and sodium.

10. The process of claim 9, wherein separation of crystals from the brine component of the slurry is accomplished by filtration.

References Cited in the file of this patent

UNITED STATES PATENTS

| | | |
|---|---|---|
| 2,683,649 | Hirsch | July 13, 1954 |
| 2,687,339 | Dancy et al. | Aug. 24, 1954 |
| 2,758,912 | Dancy | Aug. 14, 1956 |

FOREIGN PATENTS

| | | |
|---|---|---|
| 1,209,218 | France | Sept. 21, 1959 |